(12) United States Patent
Gilbert (10) Patent No.: US 7,937,793 B1
(45) Date of Patent: May 10, 2011

(54) VEHICLE TIRE CLEANING SYSTEM

(76) Inventor: William Gilbert, North Las Vegas, NV (US)

( * ) Notice: Subject to any disclaimer, the term of this patent is extended or adjusted under 35 U.S.C. 154(b) by 875 days.

(21) Appl. No.: 11/880,896

(22) Filed: Jul. 23, 2007

Related U.S. Application Data (60) Provisional application No. 60/832,326, filed on Jul. 21, 2006.

(51) Int. Cl.
*B60S 3/00* (2006.01)
(52) U.S. Cl. .............................. 15/53.4; 15/36
(58) Field of Classification Search ............ 15/53.4, 15/88.2, 88.3
See application file for complete search history.

(56) References Cited

U.S. PATENT DOCUMENTS

| | | | |
|---|---|---|---|
| 1,479,841 A | | 1/1924 | Stover |
| 1,487,062 A | * | 3/1924 | Hohl .............................. 134/109 |
| 1,651,045 A | | 11/1927 | Smith |
| 1,909,869 A | | 5/1933 | Randrup |
| 3,312,991 A | | 4/1967 | Matson |
| 3,643,272 A | | 2/1972 | Rickel |
| 3,903,559 A | | 9/1975 | Kuster et al. |
| 4,014,060 A | * | 3/1977 | Taylor ................................ 15/36 |
| 4,233,703 A | * | 11/1980 | Clyne et al. ..................... 15/53.4 |
| 4,280,244 A | * | 7/1981 | Spirig ............................... 15/40 |
| 5,860,180 A | | 1/1999 | Heise |
| 6,406,549 B1 | | 6/2002 | Berg et al. |
| 6,881,006 B1 | | 4/2005 | Lange |
| 6,895,978 B2 | | 5/2005 | Midkiff |
| 2005/0015902 A1 | * | 1/2005 | Pulvermacher ................ 15/53.4 |

FOREIGN PATENT DOCUMENTS

| | | |
|---|---|---|
| GB | 2147859 | 5/1983 |
| JP | 52046675 | 4/1977 |
| JP | 57074252 | 5/1982 |
| JP | 58030856 | 2/1983 |
| JP | 58030857 | 2/1983 |

* cited by examiner

*Primary Examiner* — Monica S Carter
*Assistant Examiner* — Stephanie Newton
(74) *Attorney, Agent, or Firm* — Thorpe North & Western LLP (57) ABSTRACT

A vehicle tire cleaning system comprises a support grate, configured to enable positioning of a tire of a vehicle thereupon. The support grate is capable of supporting a load of the tire thereupon while the tire is mounted to the vehicle. A plurality of openings is formed in the support grate. A carrier is moveable with respect to the support grate. A plurality of abrading elements is coupled to the carrier and each is extendable through the openings. The abrading elements are operable to abrade the tire supported by the support grate as the tire and the abrading elements move relative to each another.

17 Claims, 6 Drawing Sheets

VEHICLE TIRE CLEANING SYSTEM

RELATED APPLICATIONS

Priority is claimed to U.S. Provisional Patent Application Ser. No. 60/832,326, filed Jul. 21, 2006, which is hereby incorporated herein by reference in its entirety.

BACKGROUND OF THE INVENTION

1. Field of the Invention

The present invention relates generally to systems that clean (e.g., remove dirt, dust, rocks, etc. from) tires on vehicles such as a cars, trucks, tractor-trailer rigs, and the like.

2. Related Art

As equipment such as pickup trucks, dump trucks, concrete trucks, earth moving equipment, etc., leaves a construction site, the equipment can often carry with it dirt, mud, rocks and other debris that can be transferred to roadways adjacent the construction site, or can be released into the atmosphere as the vehicle's speed increases. This tracked-out debris, or "track-out," can cause roadway hazards, and can also violate environmental protection regulations and other rules promulgated to reduce the nuisance of such track-out. For example, some air quality regulations, when combined with some storm water pollution rules, disallow virtually all track-out from construction sites. Track-out violations can result in fines being incurred by the general contractor or subcontractor, with fines sometimes escalating for each offense. Since eliminating track-out entirely is extremely difficult, if not impossible, fines can often be reduced by showing attempts at track-out prevention efforts.

Some of these track-out prevention efforts have included vacuum street sweepers, track-out rock pads and wheel washers. Each of these methods has proved problematic in one manner or another. For example, vacuum street sweepers don't prevent track-out, but instead clean up material already tracked out. Since it is the tracked out material that resulted in the regulations being violated, clean up alone does not prevent the violation, and in fact evidence of clean up can be regarded as evidence of a violation.

Track-out rock pads are shallow ditches filled with clean, loose gravel over and through which a departing vehicle traverses. As the vehicle tires move through the ditch, the loose rock in the ditch acts to dislodge material adhered to the tire. A permit is often required to operate such rock pads, and the rock pads often don't eliminate track-out completely. In fact, if a construction site is muddy, the gravel in the rock pad may increase track-out problems.

Both high pressure and low pressure wheel washers have been developed for removing track-out from construction vehicle tires. Some of these systems have proven effective in eliminating track-out, but usually require permanent structures with controllable site conditions and established roadways. Additionally, these systems are expensive and can actually promote track-out when water is not properly contained.

SUMMARY OF THE INVENTION

It has been recognized that it would be advantageous to develop a system for properly cleaning construction vehicle tires leaving a construction site. In addition, it has been recognized that it would be advantageous to develop a system to dislodge and recover track-out debris from construction vehicle tires.

The invention provides a vehicle tire cleaning system, including: a support grate, configured to enable positioning of a tire of a vehicle thereupon, the support grate being capable of supporting a load of the tire thereupon while the tire is mounted to the vehicle. A plurality of openings can be formed in the support grate and a carrier can be moveable with respect to the support grate. A plurality of abrading elements can be coupled to the carrier and can be extendable through the openings. The abrading elements can be operable to abrade the tire supported by the support grate as the tire and the abrading elements move relative to each another.

In accordance with another aspect of the invention, a vehicle tire cleaning system is provided, including a support grate, configured to enable positioning of a tire of a vehicle thereupon. The support grate can include a plurality of rails extending thereacross and forming a plurality of openings therebetween. The rails can collectively be capable of supporting a load of the tire thereupon while the tire is mounted to the vehicle. A carrier can be moveable with respect to the support grate. A plurality of abrading bristles can be coupled to the carrier, the abrading bristles extendable through the openings formed between the rails and moveable within the openings to thereby clean the tire supported by the support grate as the tire and the bristles move relative to each another.

In accordance with another aspect of the invention, a method is provided for removing track-out from one or more tires of a vehicle, comprising: positioning and supporting a load of a tire of a vehicle upon a support grate; moving the tire and a plurality of bristles relative to one another to thereby abrade or clean or remove track-out from the tire with the bristles, the bristles extending through openings formed in the support grate between a plurality of rails extending across the support grate; and collecting track-out removed from the tire in a catch basin positioned adjacent the support grate.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention generally provides for a system for cleaning tires of vehicles as the vehicles transition between a construction or a manufacturing location to a "clean" area, such as a public highway or roadway. In one embodiment, the invention provides a dry, substantially parallel and opposing wheel or tire cleaning device. The tire cleaning device can be embedded into a roadway such that the vehicles' tires will traverse the tire cleaning device as they travel along the roadway. The tire cleaning device can include two opposing track segments and two parallel track segments. The opposing track segments can have movable brushes that contact and abrade (or brush) the tire in a transverse or lateral direction with respect to the tire. The parallel track segments can have movable brushes that contact and abrade or brush the tire in a longitudinal or circumferential direction with respect to the tire. The two opposing segments and two parallel segments can be placed in (or incorporated into a structure that extends above) the roadway in a spaced apart, parallel relationship with one another. Specifically, an opposing segment and a parallel segment can be placed adjacent one another to form a tire track. Thus, two tire tracks can be formed and spaced apart so as to provide a tire track for each side of a vehicle. In this manner, as a vehicle traverses the tire tracks, the tires on either side of the vehicle can be cleaned, brushed or otherwise abraded to remove mud, dirt, rocks, etc. from the tires of the vehicle.

As illustrated in the attached figures, a tire cleaning/track-out prevention device, indicated generally at 10, is shown in accordance with the present invention for use in cleaning tires 6 of construction vehicles 8 before, or as, or immediately after, the vehicle exits a construction site. The tire cleaning device 10 can include a frame 14 that can be capable of supporting the tire 6 of the vehicle 8 (as well as the weight applied to the tire by the vehicle). In one embodiment of the invention, the frame 14 can be embedded or buried in a roadway so that a top surface 18 of the frame can be flush with the roadway surface 4. The frame 14 can form a catch basin 22 below the roadway surface. In other aspects of the invention, the frame can form an above-ground assemblage such that the vehicle is driven up one or more ramps, across the support grate, and (if necessary) down another set of ramps.

Figure 1:
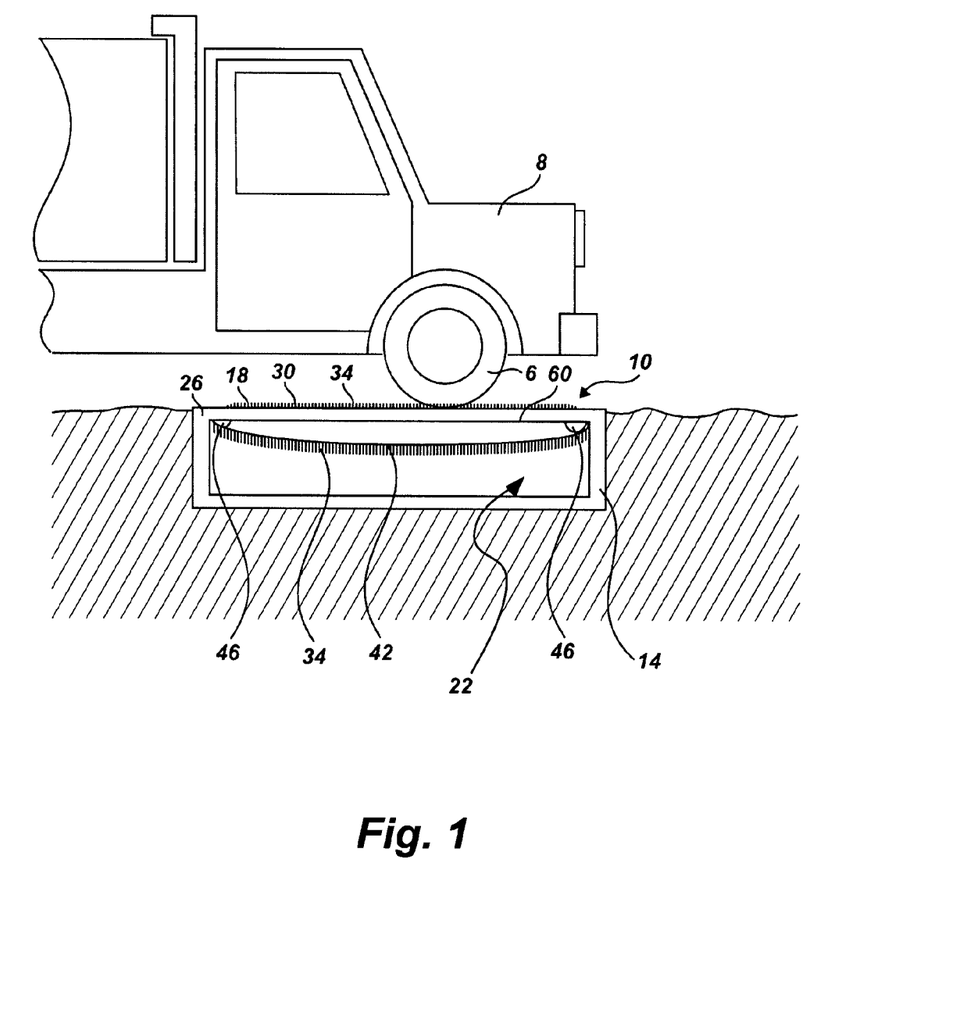
FIG. 1 is a side, schematic view of a portion of a vehicle atop a tire cleaning system in accordance with an embodiment of the present invention.
Figure 2:
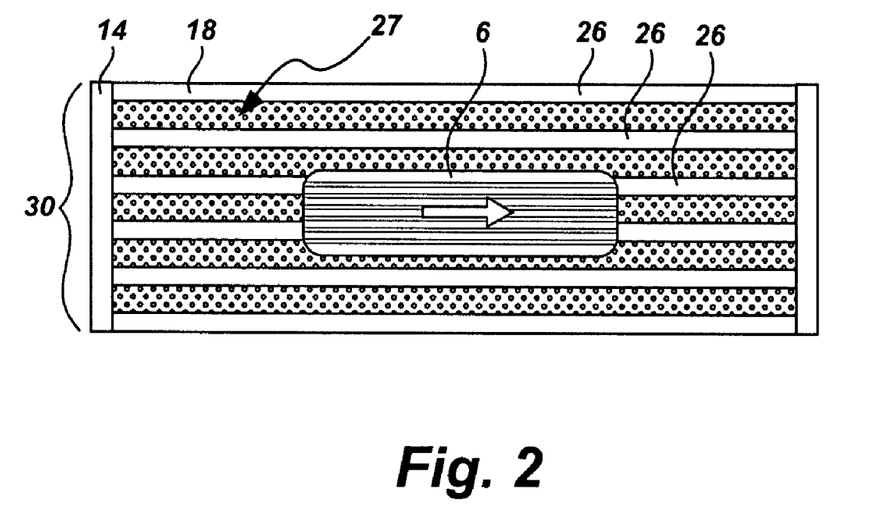
FIG. 2 is a top view of a support grate of the tire cleaning system of FIG. 1.
Figure 3:
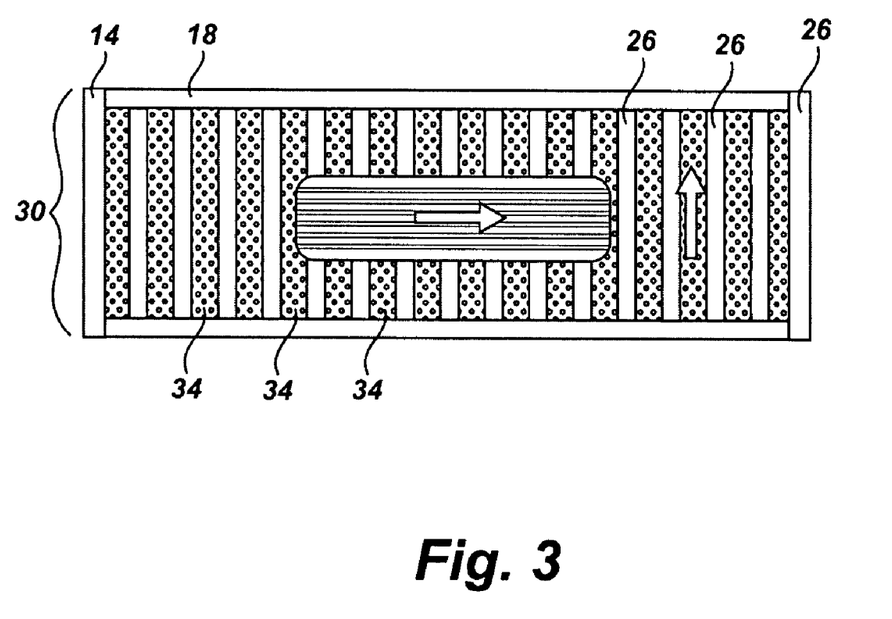
FIG. 3 is a top view of a support grate in accordance with another embodiment of the tire cleaning system of FIG. 1.
Figure 4:
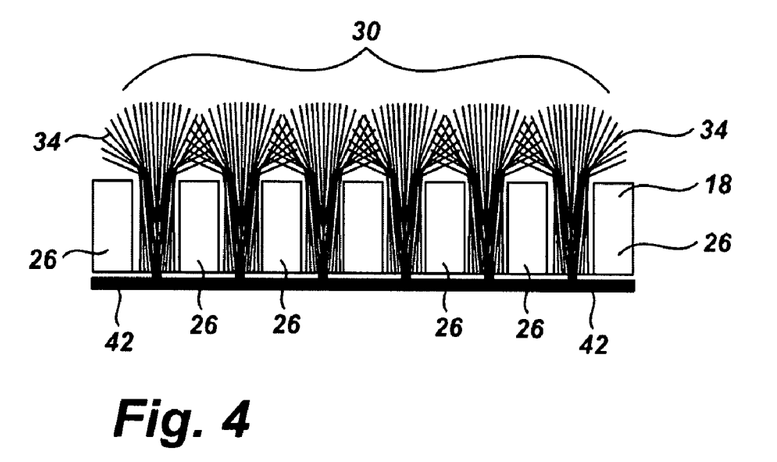
FIG. 4 is an end, sectional view of a tire support track of the tire cleaning system of FIG. 1.
Figure 5:
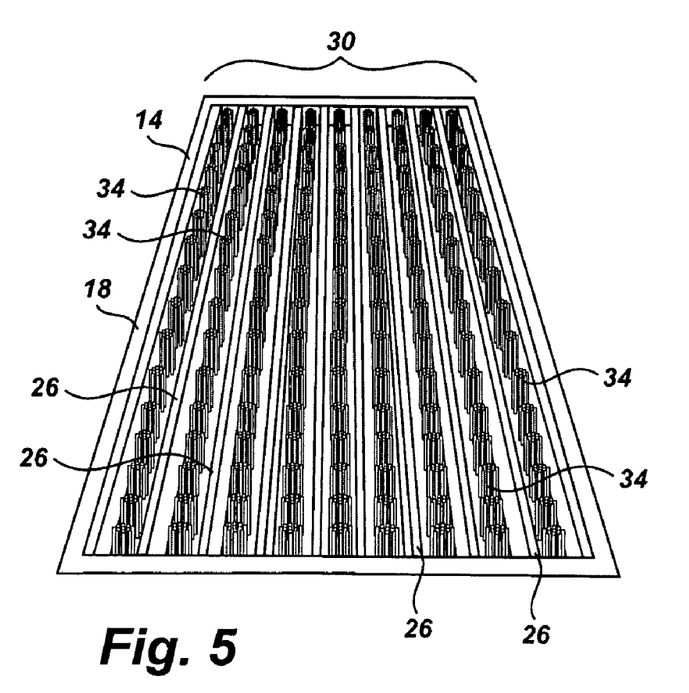
FIG. 5 is a perspective view of a tire support grate in accordance with an embodiment of the invention.
Figure 6:
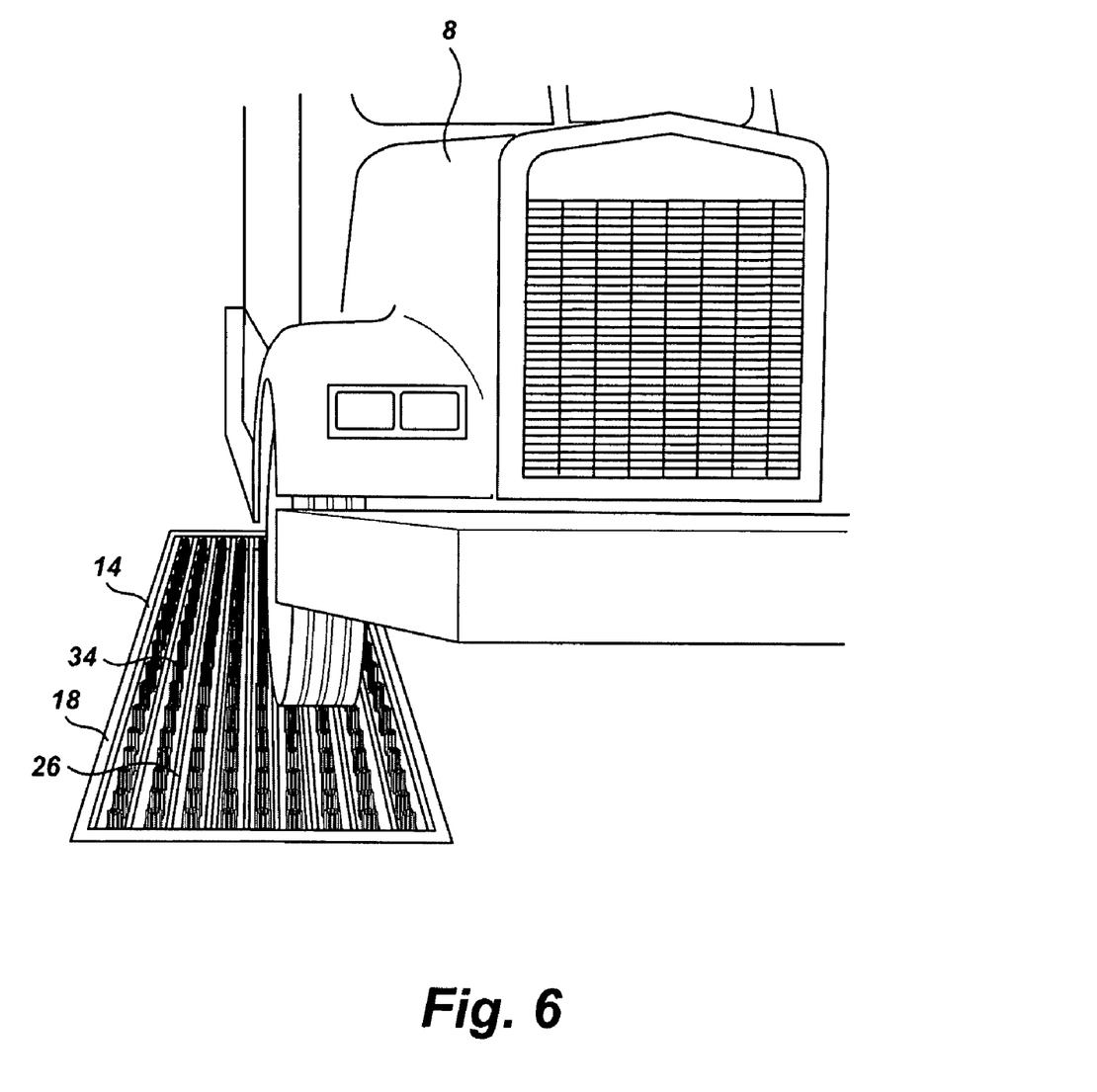
FIG. 6 is a perspective view of the tire support grate of FIG. 5, shown with a vehicle tire positioned thereon.

As shown in FIG. 2, a plurality of rails 26 can be disposed across the top surface 18 of the frame 14 and can collectively form a support grate 27. The plurality of rails 26 can be oriented in a spaced apart parallel relationship to one another to thereby form a plurality of spaces or openings 27 therebetween. In one aspect, the plurality of rails 26 can be oriented in direction parallel to a longitudinal axis of a vehicle 8, or the direction of travel of the vehicle, as shown in FIG. 2. In another aspect, the plurality of rails 26 can be oriented in a direction transverse to the longitudinal axis of a vehicle 8, or transverse to the direction of travel of the vehicle, as shown in FIG. 3.

The tire cleaning device 10 can also include a plurality of 34 interspersed in the openings between the plurality of rails 26. In one aspect of the invention, the plurality of brushes can be moveable with respect to the support grate 30. The movable brushes can extend above the plurality of rails (e.g., beyond a surface of the support grate that supports the tire), or can be extendable, periodically or cyclically, above the plurality of rails. The brushes 34 can contact a vehicle tire 6 disposed on the tire support track 30. The brushes 34 can move in order to brush or abrade the tire 6 supported on the tire support track 30.

It will be appreciated that many types of movement by the brushes can abrade or brush the tires to dislodge debris from the tires. For example, the brushes 34 can be coupled to a continuous loop assembly 42 that can extend around wheels 46 that are disposed adjacent the ends of the tire support track 30 so that the continuous loop assembly 42 extends along a lower surface 50 of the tire support track 30. The brushes 34 on the continuous loop assembly 42 can extend away from the belt and upward through the spaces or openings between the plurality of rails 26. In this way, as the continuous loop assembly 42 is turned on the wheels 46, the brushes 34 can move in the spaces between the plurality of rails 26 and contact a vehicle tire 6 on the tire support rack 30 to brush or abrade the tire 6 to clean the tire.

The continuous loop assembly can take a variety of forms, and in one embodiment includes a continuous loop belt, such as that commonly referred to as a "conveyor" belt. In another aspect of the invention, the continuous loop assembly can be formed from a series of chains or similar structure that are fitted over sprockets or similar gears. The chains can securely be engaged with teeth of the sprocket or gear to ensure consistent movement of the continuous loop assembly about the sprocket or gear. The present inventor has found a chain-based continuous loop assembly to be advantageous in that sidewise slippage of the continuous loop assembly can be minimized by the chain and sprocket relationship. While continuous loop belts are used with success as well, a belt can tend to slide sideways during operation of the system.

It will be appreciated that many types of continuous loop assemblies 42 can sag or bow if required to span any considerable distance. In one aspect of the present invention, a support plate 60 with a low friction surface can be placed and secured under the continuous loop belt or assembly and the plurality of rails. The low friction surface can be formed by a plastic coating, such as Teflon®, urethane, verathane, or the like. The support plate 60 can provide a stable, low friction support for the continuous loop belt 42. In addition, a low-friction material can be applied to an underside of the continuous loop belt or assembly to serve the same purpose.

In the case where the plurality of rails 26 is oriented parallel to the direction of travel of the vehicle 8, the brushes 34 can move either opposite to, or in the same direction of travel as, the rotation of the tire 6. Moving the brushes 34 counter to the rotation of the tire 6 provides a very aggressive abrading effect on the tire 6, and can be used in cases of heavy debris collection on tires, such as muddy site conditions. Moving the brushes 34 in the same direction as the rotation of the tire 6 provides a less aggressive abrading of the tire and can be used in light debris collecting circumstances, such as dry hard pack conditions, in order to minimize wear on the brushes and tires. In either case, the system can be used to clean tires of vehicles while the vehicle is traveling over the support grate: the vehicle need not be stopped or positioned in a very exacting location to effectuate cleaning of the tires.

Similarly, in the case where the plurality of rails 26 is oriented transversely to the direction of travel of the vehicle 8, the brushes 34 can be made to move either toward the center of the vehicle, or away from the vehicle. Thus, as vehicle 8 moves across the track support surface 30, the brushes 34 can be moved in either or both directions in order to maximize debris removal from the tire 6. In addition, brushes (and brush powering mechanisms) can be provided that provide rotational brush movement (relative to the direction of travel of the tire), along with or in addition to transverse or longitudinal movement of the brushes.

While the exemplary embodiments illustrated in the figures include a substantially continuous loop assembly to carry the abrading elements, in one aspect of the invention the carrier can include a substantially planar plate that moves relative to the support grate. The plate can be coupled to a drive system that causes the plate to move backwardly and forwardly (or side-to-side) relative to the support grate. Alternately, the plate carrier can be configured to move in a circular pattern relative to the support grate.

Figure 8:
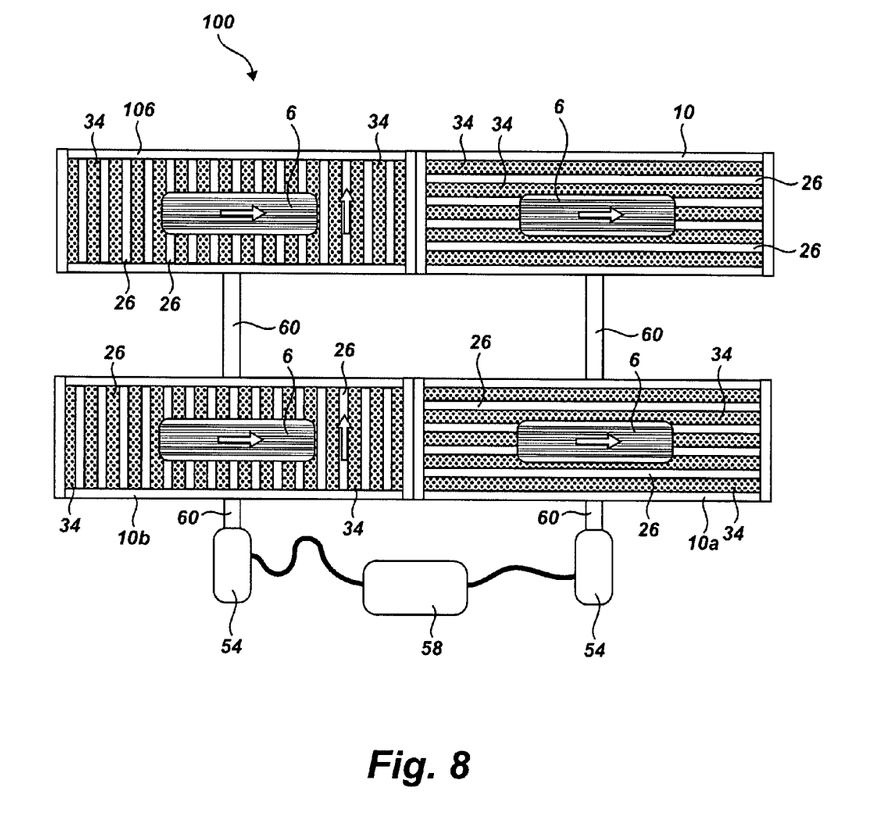
FIG. 8 is a top view of a tire cleaning system in accordance with an embodiment of the invention.

As best appreciated from FIG. 8, the tire cleaning system 10 can also include a power transfer device 54 to transfer power to the movable brushes 34. The power transfer device can include electric motors, gas motors, shafts, pulleys, gears, transmissions, axles, and the like. The power transfer device 54 can transfer power from a power source 58, such as a generator or an electrical power box, to the movable brushes 34 to move the brushes in relation to the plurality of rails 26.

In use, a vehicle 8 can drive atop, or can otherwise be positioned over or atop, the tire cleaning system 10 so that the vehicle tires 6 move across the tire support track 30. As the tires 6 move across the tire support track 30, the continuous loop assembly or belt 42 can move the brushes 34 through or between the openings or spaces 27 between the plurality of rails 26 and contact the tire. As the brushes 34 contact the tire 6, the brushes clean the tire by abrading or brushing the tire to dislodge debris such as mud, dirt, rocks, and the like. Debris dislodged by the brushes 34 can fall through the brushes and onto, or through the continuous loop belt 42. Debris that falls through the continuous loop belt 42 can collect in the catch basin 22 below the belt, and debris that falls onto the continuous loop belt can ride with the belt until the belt turns around the wheels, at which point the debris can fall into the catch basin 22. The catch basin 22 can be emptied of debris periodically to prevent debris buildup that may inhibit movement of the continuous loop belt 42.

Figure 7:
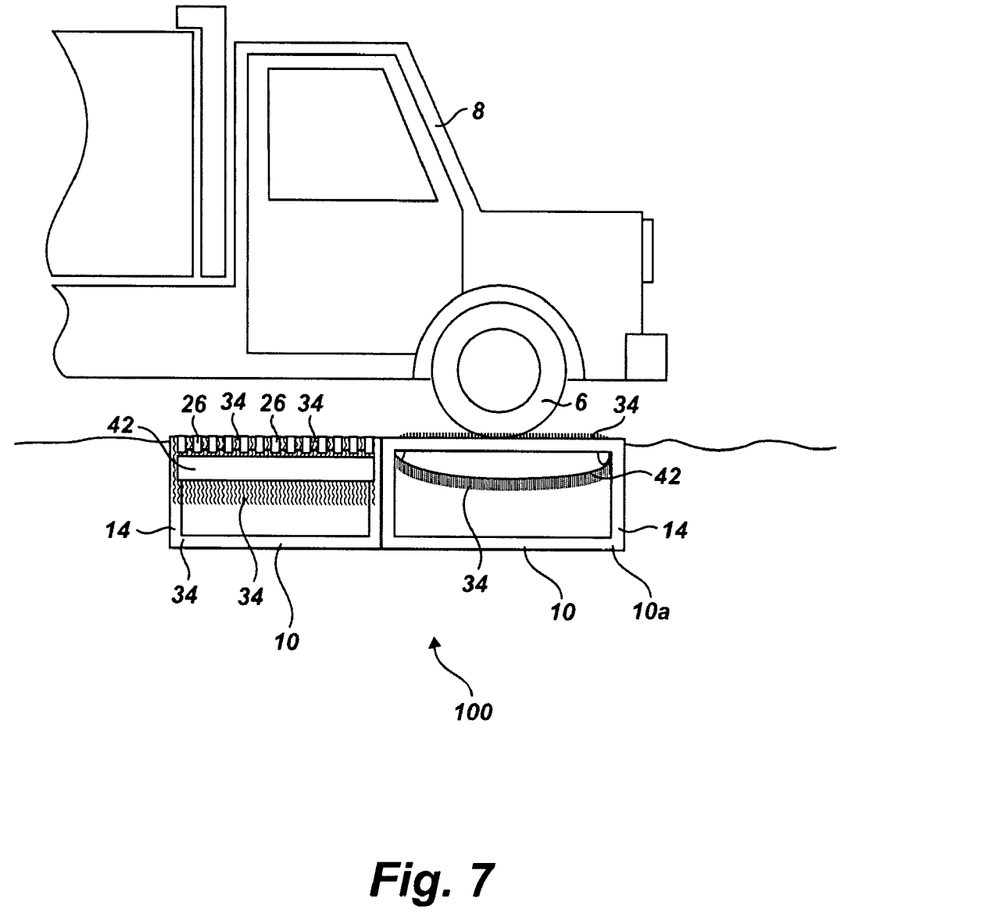
FIG. 7 is a side view of a tire cleaning system in accordance with another embodiment of the present invention.

Referring to FIGS. 7 and 8, a tire cleaning system, indicated generally at 100, is shown in accordance with the present invention for use in cleaning tires 6 of construction vehicles 8 before the vehicles leave a construction site, or before the vehicles move from one portion of a construction site to another. The tire cleaning system 100 can include a plurality of tire cleaning devices 10 described above. The tire cleaning devices 10 can have tire support grates 30 with the plurality of rails extending in transverse and parallel directions with respect to the direction of travel of the vehicle.

As illustrated in FIG. 8, the tire cleaning system 100 can have two tire cleaning devices 10a with the plurality of rails 26 oriented parallel to the direction of travel of the vehicle 8, and two other tire cleaning devices 10b with the plurality of rails 26 oriented transverse to the direction of travel of the vehicle 8. One of the transverse tire cleaning devices 10b can align with one of the parallel tire cleaning devices 10a to form a tire track segment. Two tire track segments can be formed, and can be oriented in a spaced apart, parallel relationship to one another. The two tire track segments can be spaced apart a distance sufficient to correspond to the distance between the tires of construction vehicles, such as dump trucks, graders, dozers, and the like.

A power transfer device 54 can be coupled to the parallel tire cleaning devices 10a and another power transfer device 54 can be coupled to the transverse tire cleaning devices 10b. A plurality of connecting shafts can transfer power from the power transfer device to the tire cleaning devices 10a and 10b.

Advantageously, forming a tire track segment with one transverse tire cleaning device 10b and one parallel tire cleaning device 10a maximizes the cleaning effect of the brushes 34 abrading the tires 6. Additionally, the length of the tire track segment can provide a longer catch basin in which to catch debris dislodged from the tires 6 thereby further reducing track-out from the construction site.

It will be appreciated that the rails 26 oriented in various manners in the different embodiments of the invention shown form openings or cavities through which the brushes 34 can protrude, either substantially all the time or in a periodic or cyclic manner. In other embodiments of the invention, the openings can be formed in such a manner that the brushes cannot travel great distances transversely along the openings, but can instead protrude through the openings and rotate, vibrate, or otherwise move in an abrading fashion to clean the tires of the vehicle. In addition, it is contemplated that the brushes can cyclically protrude through and retract below the openings.

While the abrading elements 34 are shown in the figures as comprising brushes, or bristled units, it is to be understood that the abrading elements can be formed from a variety of suitable materials and in a variety of suitable configurations. For example, the abrading elements can be formed from strips of suitable material, such as rubber, cloth, polymers, etc. The abrading elements can also be formed from a variety of materials suitable to abrade debris from the tires without causing undue damage to the tires.

The exemplary embodiments illustrated in the figures form a "dry," system: e.g., a cleaning system that does not include significant use of waters, soaps, etc. The inventor has found that such a system is generally more compatible with most work site conditions and requirements. In addition, however, it is contemplated that the brushes or abrading elements can be combined with auxiliary abrading systems, including forced gas (for example, pressurized air) that can aid in abrading the debris from the tires, a vacuum source that can aid in drawing debris away from the abrading operation, forced water, etc. Also, the system can include a debris recovery system, such as a vacuum system, that can aid in trapping debris removed from the tires of the vehicle to aid in limiting or preventing the debris from entering the atmosphere as it is removed from the tires.

The present invention can also provide a method for cleaning tires on a vehicle including driving, or otherwise positioning, a vehicle in order to position at least one vehicle tire on a tire support track. A catch basin can be formed below a frame supporting the support track. A power transfer device can be actuated to move a plurality of brushes through spaces between a plurality of rails in order to abrade the at least one vehicle tire, thereby cleaning debris from the tire. The vehicle tire can be driven off the tire support track, and debris can be removed from the catch basin.

The present invention can also provide for a method for making a tire cleaning system including digging a hole in a road way surface. At least one tire cleaning system can be placed in the hole in the roadway to form a tire support track. The tire support track can have a plurality of rails in a spaced apart, parallel relationship supported by a frame, and a plurality of movable brushes disposed to extend between the plurality of rails. A catch basin can be formed in the hole below the tire support track. A power transfer device can be coupled to the plurality of movable brushes. A power source can be coupled to the power transfer device. The power source can be activated and can transfer power through the power transfer device to the movable brushes.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

I claim:

1. A vehicle tire cleaning system, comprising:
    a support grate, configured to enable positioning of a tire of a vehicle thereupon, the support grate being capable of supporting a load of the tire while the tire is mounted to the vehicle;
    a plurality of openings, formed in the support grate;
    a carrier, moveable with respect to the support grate;
    a plurality of abrading elements, coupled to the carrier and being extendable through the openings, the abrading elements being operable to clean the tire supported by the support grate as the tire and the abrading elements move relative to each another; and
    a support plate, disposed within the continuous loop assembly and being operable to maintain at least a portion of the continuous loop assembly in a substantially planar configuration while the continuous loop assembly moves beneath the tire.

2. The system of claim 1, wherein the plurality of abrading elements comprises a plurality of bristles, and wherein the bristles are coupled to the carrier with the carrier being driven by a power source to thereby move the plurality of bristles relative to the tire.

3. The system of claim 2, wherein tips of at least some of the bristles define a substantially planar abrading profile.

4. The system of claim 2, wherein the carrier comprises a substantially continuous loop assembly.

5. The system of claim 2, wherein the carrier comprises a rotatable drum.

6. The system of claim 1, wherein the carrier comprises a moveable plate having at least one substantially planar portion to which the abrading elements are coupled.

7. The system of claim 1, wherein the abrading elements contact a lowermost portion of the tire across substantially an entire width of the lowermost portion of the tire.

8. The system of claim 7, wherein the abrading elements are extendable beyond a tire contact surface of the support grate.

9. The system of claim 1, wherein the system comprises a dry system.

10. A vehicle tire cleaning system, comprising:
    a support grate, configured to enable positioning of a tire of a vehicle thereupon;
    the support grate including a plurality of rails extending thereacross and forming a plurality of openings therebetween, the rails collectively being capable of supporting a load of the tire thereupon while the tire is mounted to the vehicle;
    a carrier, moveable with respect to the support grate;
    a plurality of abrading bristles, coupled to the carrier, the abrading bristles extendable through the openings formed between the rails and moveable within the openings to thereby clean the tire supported by the support grate as the tire and the bristles move relative to each another; and
    a support plate, disposed immediately below and supporting the carrier to prevent movement of the carrier away from the support grate while the bristles move beneath the tire.

11. The system of claim 10, wherein tips of at least some of the bristles define a substantially planar abrading profile.

12. The system of claim 10, wherein the carrier comprises a substantially continuous loop assembly.

13. The system of claim 10, wherein the carrier comprises a rotatable drum.

14. The system of claim 10, wherein the carrier comprises a moveable plate having at least one substantially planar portion to which the abrading elements are coupled.

15. The system of claim 10, wherein the abrading bristles contact a lowermost portion of the tire across substantially an entire width of the lowermost portion of the tire.

16. The system of claim 10, wherein the abrading elements are extendable beyond a tire contact surface of the support grate.

17. The system of claim 10, wherein the system comprises a dry system.

* * * * *